F. HOTCHNER.
CABLE CLAMP.
APPLICATION FILED SEPT. 29, 1920.

1,396,115.

Patented Nov. 8, 1921.

INVENTOR.
Fred Hotchner.

BY
Carlos P. Griffin
ATTORNEY.

UNITED STATES PATENT OFFICE.

FRED HOTCHNER, OF SAN FRANCISCO, CALIFORNIA.

CABLE-CLAMP.

1,396,115.   Specification of Letters Patent.   Patented Nov. 8, 1921.

Application filed September 29, 1920. Serial No. 413,525.

*To all whom it may concern:*

Be it known that I, FRED HOTCHNER, a citizen of the United States, residing at San Francisco, in the county of San Francisco, State of California, have invented a new and useful Cable-Clamp, of which the following is a specification, in such full and clear terms as will enable those skilled in the art to construct and use the same.

This invention relates to a cable clamp and its object is to provide means whereby one cable may be securely attached to another cable ordinarily at a right angle thereto with a smooth connection which will not seriously interfere with the operation to which the cables are to be put.

It will be understood by those skilled in the art that in the construction of large tents, in the rigging of ships, in the production of merchandise slings for hoisting merchandise aboard ships and in many other places it is necessary to provide permanent means to connect one cable to another cable, which means must not unduly project from the cables to interfere with the operation to which the cable is to be put.

Another object of the invention is to provide means whereby one of the cables may be securely locked to the clamp throughout a considerable surface, so that it will hold the other cable more securely.

Another object of the invention is to provide means for bringing the strands of the cable together without damaging them.

Another object of the invention is to secure two cables together by means which will engage the maximum number of strands and which will not open the lay of the cable.

Other objects of the invention will appear as the description proceeds.

An embodiment of the invention is shown in the accompanying drawings in which the same reference numerals is applied to the same portion throughout, but I am aware that there may be modifications thereof.

Figure 1:
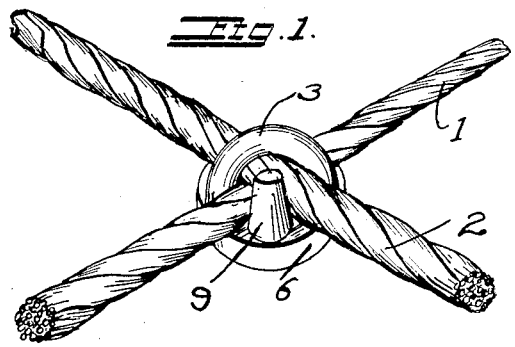
Figure 1 is a perspective view of the cable clamp showing it applied to two crossing cables.
Figure 2:
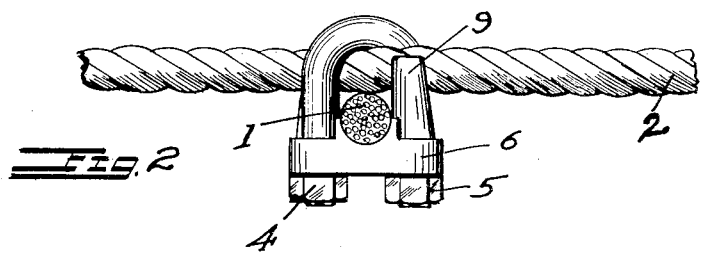
Fig. 2 is a side elevation of the cable clamp showing two cables in place thereon.
Figure 3:
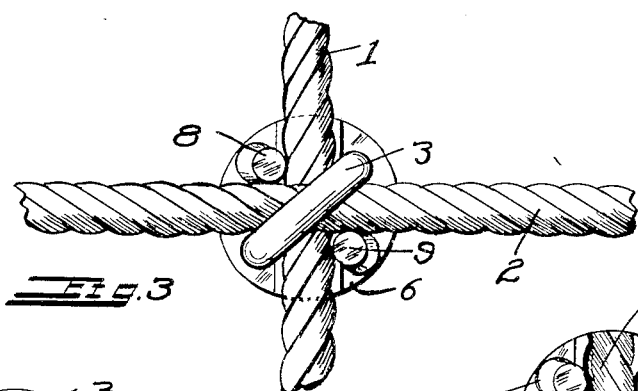
Fig. 3 is a plan view of the cable clamp showing the two cables in place thereon.
Figure 4:
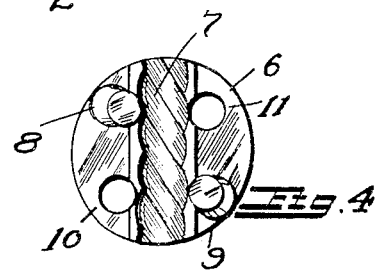
Fig. 4 is a plan view of the cable clamp plate with the cables and U-bolt removed therefrom.
Figure 5:
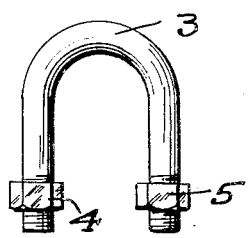
Fig. 5 is a side elevation of the U-bolt for securing the cables to the clamp plate.

The numerals 1 and 2 indicate portions of cables which are to be joined together, the clamp comprises a U-bolt 3 having nuts 4 and 5 applied thereto and a plate 6. The plate 6 is provided with a roughened seat 7 adapted to fit the cable and it also has two projecting prongs 8 and 9. These prongs are so designed with respect to two holes 10 and 11 that when the U-bolt is in place and two cables in place passing through the U-bolt, that the two cables will be held at desired angles with respect to each other.

What I claim is as follows, but various modifications may be made in the construction shown in the drawings and above particularly described form, within the purview of my invention:

1. A clamp for securing cables together comprising a plate having a pair of projecting lugs and a U-bolt passing through openings in the plate symmetrically disposed with respect to the lugs.

2. A cable clamp comprising a plate having a seat for a cable thereon, a pair of projecting lugs on opposite sides of the cable seat and a U-bolt passing through holes in the plate symmetrically disposed with respect to the projecting lugs.

3. A cable clamp comprising a plate having a seat adapted to fit one side of a cable, a pair of projecting lugs on opposite sides of said seat and a U-bolt passing through holes in the plate symmertically disposed with respect to the seat and lugs.

4. A clamp for securing crossed cables consisting of a flat plate having lugs to contact with both cables and bolts symmetrically placed for securing the cables to the plate against the lugs and at an angle to each other.

In testimony whereof I have hereunto set my hand this 17th day of September, A. D. 1920.

FRED HOTCHNER.